INVENTOR.
ERNST R. SCHICKLE
BY
ATTORNEY

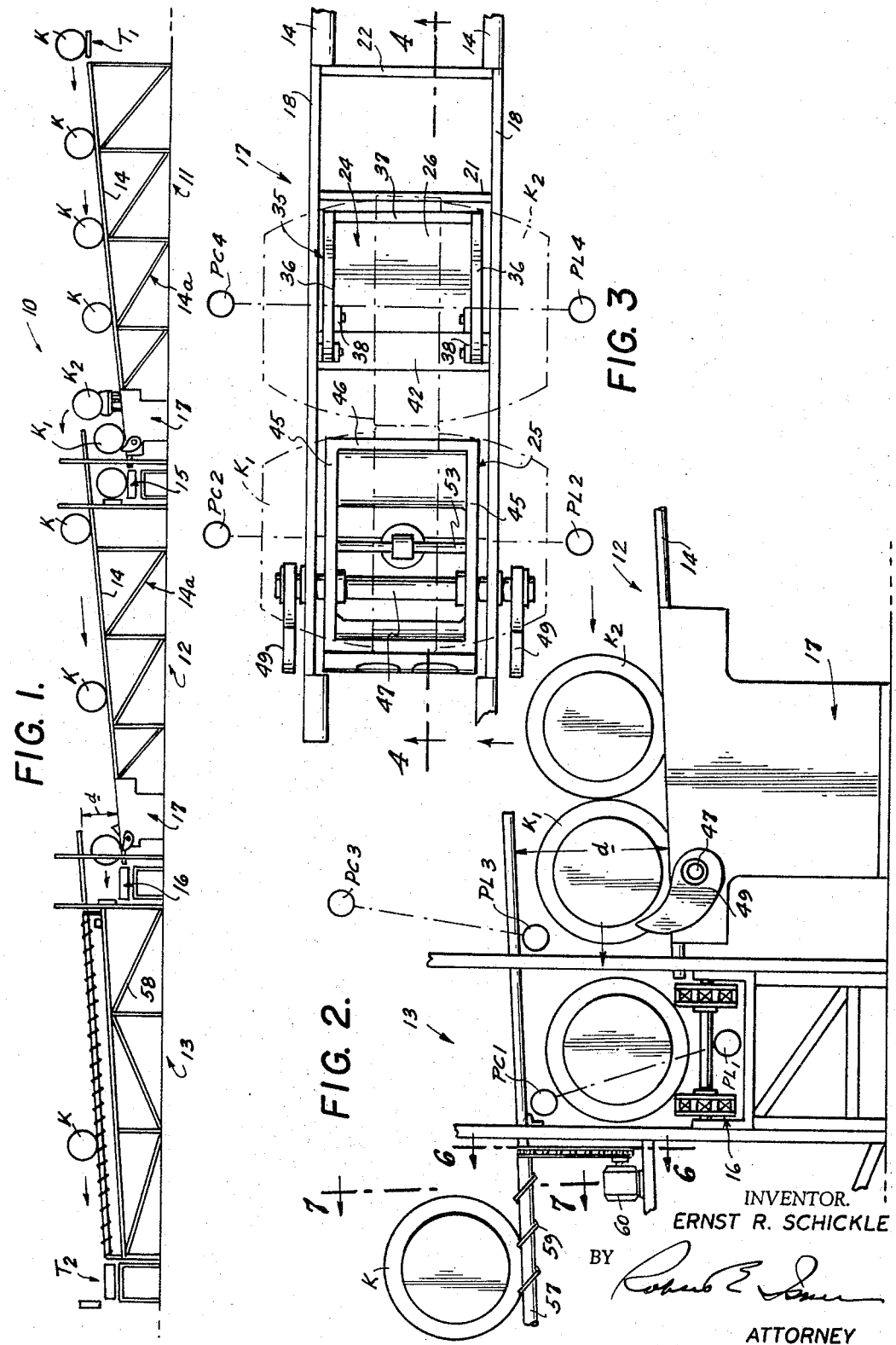
Jan. 30, 1968   E. R. SCHICKLE   3,366,219
KEG CONVEYOR
Filed Sept. 21, 1966   3 Sheets-Sheet 1
INVENTOR.
ERNST R. SCHICKLE
ATTORNEY Jan. 30, 1968    E. R. SCHICKLE    3,366,219
KEG CONVEYOR
Filed Sept. 21, 1966    3 Sheets-Sheet 2

Jan. 30, 1968  E. R. SCHICKLE  3,366,219
KEG CONVEYOR
Filed Sept. 21, 1966  3 Sheets-Sheet 3
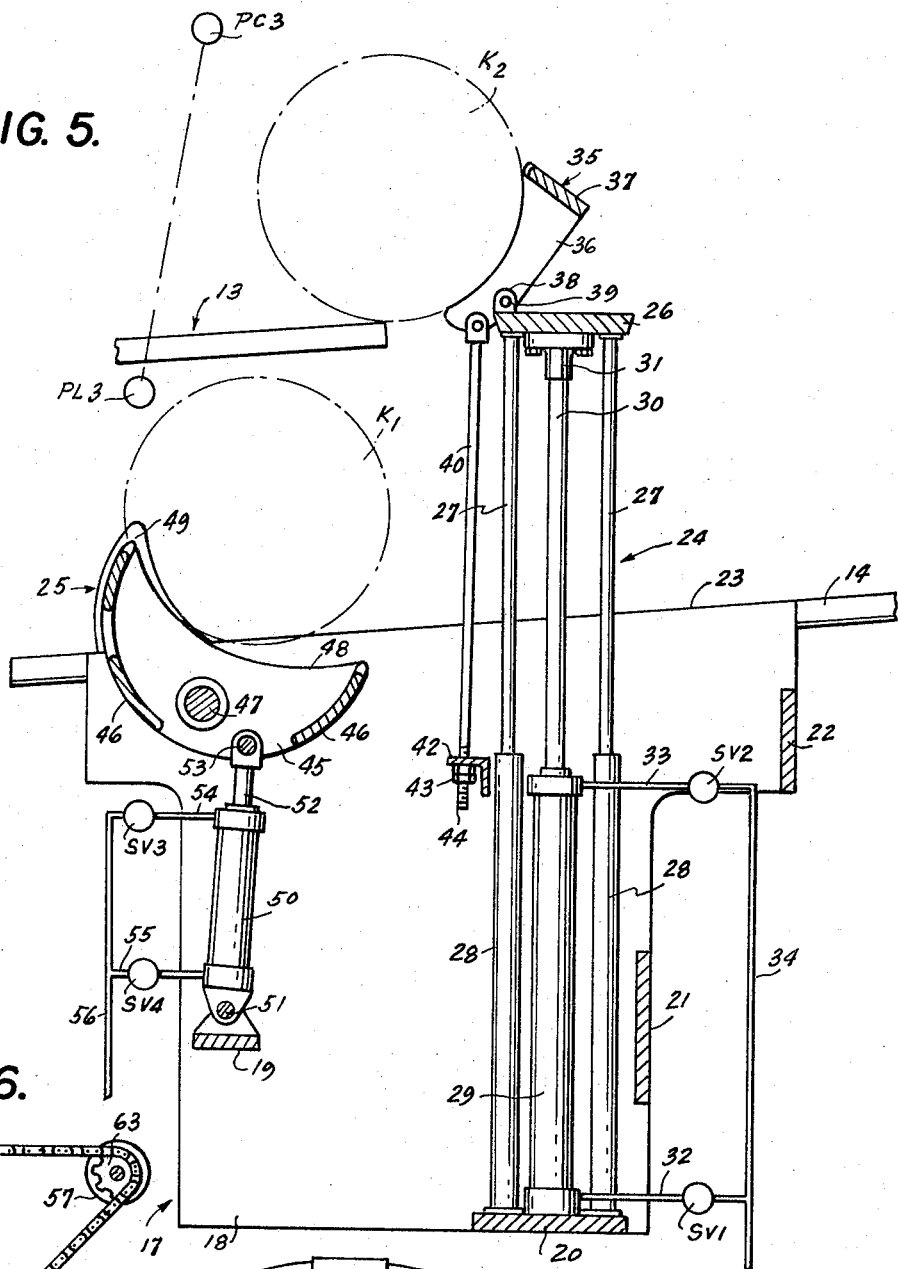
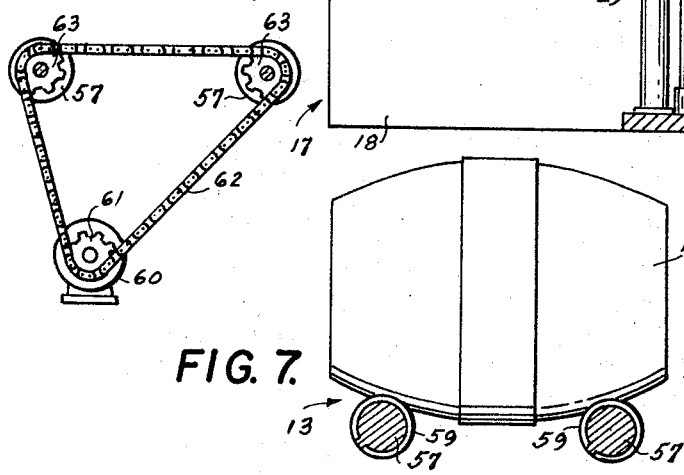
INVENTOR.
ERNST R. SCHICKLE
BY
*Robert E. Isom*
ATTORNEY United States Patent Office 3,366,219
Patented Jan. 30, 1968

3,366,219
KEG CONVEYOR
Ernst R. Schickle, Tappan, N.Y., assignor to Rheingold Breweries, Inc., Brooklyn, N.Y., a corporation of New York
Filed Sept. 21, 1966, Ser. No. 581,108
8 Claims. (Cl. 198—24)

ABSTRACT OF THE DISCLOSURE

A keg conveyor has at least first and second sections arranged end-to-end and inclined in the same direction so that kegs thereon will roll on the first section toward the second section and on the second section away from the first section, the adjacent ends of the first and second sections being at low and high levels to permit discharge of kegs from the low end of the first section under the high end of the second section, an escapement device being provided at the low end of the first section to selectively permit or bar the discharge of kegs therefrom, and an elevator device being provided in advance of the escapement device to selectively raise kegs arriving at the low end of the first section and to deposit the raised kegs on the high end of the second section for continued movement along the conveyor.

---

This invention relates generally to conveyors for transporting beer kegs, barrels or the like, for example, in breweries or distribution centers.

It is known to transport kegs on conveyor rails that are inclined longitudinally so that the kegs roll along the rails from the higher keg receiving end to the lower delivery end of the conveyor. Since the kegs may be out-of-round due to the rough handling to which they are normally subjected, the rails must be inclined with respect to the horizontal by at least a substantial minimum angle in order to ensure the reliable rolling movement of the kegs along the rails by the force of gravity. However, if the kegs are to be transported over relatively long distances by continuous rails inclined by at least such minimum angle, the difference between the elevations at the receiving and delivery ends of the conveyor may be impractically large. Kegs rolling relatively long distances along continuous rails having the necessary inclination from the horizontal will attain prohibitively high speeds which are dangerous and give rise to difficulties in handling the kegs at the delivery end of the conveyor. Further, when kegs are transported by rolling along continuous inclined conveyor rails, the lateral removal of kegs from such rails at locations intermediate the ends thereof, for example, for distribution to a number of delivery conveyors, presents serious problems.

Accordingly, it is an object of this invention to provide a conveyor for kegs or the like by which the kegs may be reliably transported by gravity over long distances without there being large differences between the elevations of the conveyor at its opposite termini, and without the danger of excessive keg speeds.

Another object is to provide a keg conveyor on which the kegs are transported with their axes extending transversely to the direction of movement so as to be capable of rolling along inclined conveyor rails, and wherein provision is made for the removal of selected kegs at one or more locations intermediate the termini of the conveyor.

In accordance with an aspect of this invention, a conveyor for kegs or the like is constituted by a plurality of conveyor sections arranged end-to-end in succession and inclined from the horizontal in the same direction so that kegs on each section are urged by gravity to move in such direction toward the relatively low end of the conveyor section, each section which is followed by another section having its low end at a level substantially below the level of the relatively high end of the following section so that the difference between the elevations at the opposite termini of the conveyor, as a whole, is substantially less than the sum of the differences between the elevations at the opposite ends of the conveyor sections, and elevator means is disposed adjacent the low end of each section followed by another section and made operative to lift at least selected kegs arriving successively at the adjacent low end and to deposit each lifted keg onto the high end of the following conveyor section for continued movement therealong.

A further object is to provide elevator means of relatively simple construction and operation, for example, to lift successive kegs from one section to the next section in a conveyor of the type described above.

In accordance with a feature of this invention, the elevator means for lifting successive kegs from the relatively low end of one conveyor section to the relatively high end of the following conveyor section preferably includes a tiltable cradle which is vertically movable from a lowered position below the lower end of that one conveyor section to a raised position adjacent the high end of the following conveyor section for lifting a keg, and means operative in response to movement of the cradle to its raised position to tilt the cradle and thereby discharge the lifted keg onto the adjacent high end of the following conveyor section.

When it is desired to remove selected kegs from the conveyor at locations intermediate the termini thereof, the conveyor is constituted by at least first and second conveyor sections arranged end-to-end in succession and adapted to move kegs therealong, for example, by being inclined in one direction, as above, with the delivery end of the first section being at a level sufficiently below that of the keg receiving end of the second section to permit the discharge therebetween of kegs from the conveyor at the delivery end of the first section as well as at the delivery end of the second section, and an escapement means is provided at the delivery end of the first section and cooperates with an adjacent elevator means to determine which of the kegs moved along the first section are removed from the conveyor at the delivery end of the first section and which of the kegs are lifted onto the second conveyor section for removal from the conveyor at the delivery end of the second section or at a location further downstream along the conveyor.

Still another object is to provide a conveyor for kegs or the like which is capable of transporting the kegs with the axes of the latter extending transversely to the direction of movement, and at a reliably controlled speed even though the path of the conveyed kegs is either steeply inclined or inclined at an angle that is less than that necessary for the reliable rolling of the kegs.

Where the path along which the kegs are conveyed is either too steeply or insufficiently inclined, the reliably controlled speed of movement of the kegs is achieved by a pair of elongated, parallel, laterally spaced conveyor screw elements extending in the direction of movement of the kegs and being rotatably mounted to support the successive kegs with their axes extending transversely to the axes of the screw elements, and the screw elements have raised helical flights to engage the peripheral surfaces of the kegs thereon and are simultaneously rotated thereby to propel the kegs along the screw elements.

The above, and other objects, features and advantages of the invention, will be apparent in the following detailed description of an illustrative embodiment thereof which is to be read in connection with the accompanying drawings, wherein:

FIG. 1 is a diagrammatic side elevational view of a conveyor for transporting kegs or the like in accordance with an embodiment of this invention;

FIG. 2 is a fragmentary, enlarged side elevational view of a portion of the conveyor of FIG. 1 at which kegs are selectively transferred from one conveyor section to the next or discharged from the conveyor;

FIG. 3 is a further enlarged, top plan view of the keg delivery end of one of the conveyor sections appearing on FIG. 2;

FIG. 5 is a view similar to that of FIG. 4, but illustrating the transfer of a keg from one conveyor section to the next section for continued movement along the conveyor;

FIG. 6 is an enlarged detail sectional view taken along the line 6—6 on FIG. 2;

FIG. 7 is an enlarged, detail sectional view taken along the line 7—7 on FIG. 2.

Figure 4:
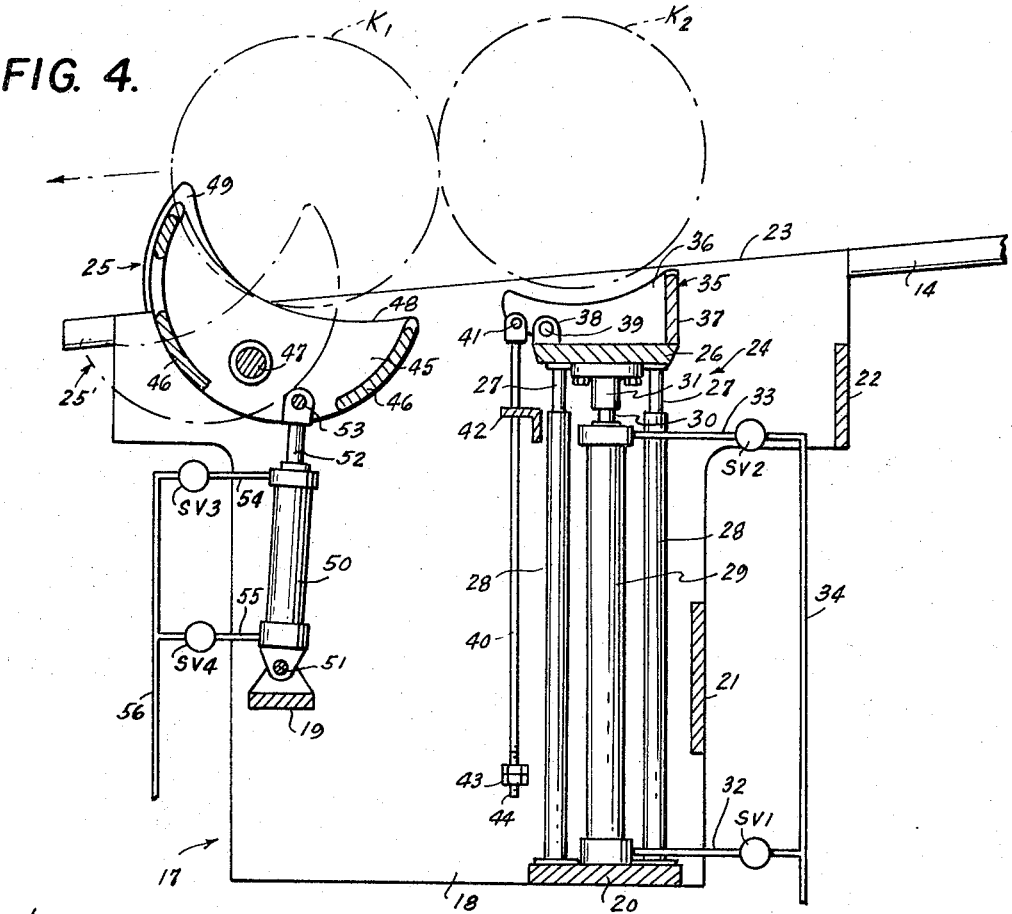
FIG. 4 is a sectional view taken along the line 4—4 on FIG. 3.

Referring to the drawing in detail, and initially to FIG. 1 thereof, it will be seen that a conveyor 10 in accordance with this invention comprises a plurality of conveyor sections, for example, the three conveyor sections 11, 12 and 13, arranged end-to-end in succession to convey kegs K from a terminal $T_1$ at one end of conveyor 10, at which the kegs are received, to a terminal $T_2$ at the opposite end of the conveyor at which at least some of the kegs are delivered or discharged.

Each of the conveyor sections may be constituted by a pair of parallel, longitudinally extending rails 14 which are laterally spaced apart and supported on a frame 14a, as in the case of conveyor sections 11 and 12, so as to be inclined downwardly from the horizontal in the direction from terminal $T_1$ toward terminal $T_2$. The angle by which rails 14 are inclined downwardly from the horizontal is sufficiently large so that kegs K placed on such rails with the axes of the kegs extending transversely with respect to the rails will be urged by gravity to roll therealong in the direction from the relatively high end toward the relatively low end of the respective conveyor section. As shown, each of the inclined conveyor sections 11 and 12 which is followed by another conveyor section 12 or 13, respectively, has its relatively low end at a level that is substantially below the level of the relatively high end of the following conveyor section. Thus, the difference between the elevations at the opposite termini $T_1$ and $T_2$ of conveyor 10, as a whole, is substantially less than the sum of the differences between the elevations at the opposite ends of conveyor sections 11, 12 and 13. By reason of the foregoing, the individual conveyor sections can be inclined at a sufficient angle from the horizontal to ensure that the kegs will reliably roll therealong even though such kegs may be out of round as a result of the rough handling to which such kegs are normally subjected, without the necessity of providing a large difference between the elevations at the opposite termini $T_1$ and $T_2$ of the conveyor.

When it is desired to discharge kegs from conveyor 10 at locations intermediate the opposite termini $T_1$ and $T_2$, for example, at the relatively low ends of the conveyor sections 11 and 12 as well as at the terminal $T_2$ to which conveyor section 13 extends, the low end of each of conveyor sections 11 and 12 is spaced downwardly from the adjacent end of the next conveyor section 12 or 13, respectively, by a distance $d$ (FIGS. 1 and 2) greater than the maximum diameter of each keg so that kegs arriving successively at the low end of each of conveyor sections 11 and 12 can pass under the adjacent, relatively high end of the next conveyor section 12 or 13, respectively, for discharge from the conveyor, for example, onto a laterally directed delivery conveyor 15 or 16, respectively.

In accordance with this invention, a device 17 is provided adjacent the relatively low end of each of conveyor sections 11 and 12 and is operative to lift at least selected kegs arriving successively at the low end of the respective conveyor section 11 or 12 and to deposit each lifted keg onto the high end of the following conveyor section 12 or 13, respectively, for continued movement therealong. When only selected kegs arriving successively at each of devices 17 are lifted by the latter and deposited onto the following conveyor section, the other kegs arriving successively at each device 17 may be discharged from conveyor 10 onto the delivery conveyor 15 or 16. However, as hereinafter described, in detail, each of devices 17 may be made operative to transfer all of the kegs arriving successively at the low end of the respective conveyor section 11 or 12 onto the next conveyor section 12 or 13, respectively, whereby kegs delivered to conveyor 10 at terminal $T_1$ can be discharged from such conveyor only at the opposite terminal $T_2$, or at the terminal $T_2$ and one or the other of the intermediate delivery conveyors 15 and 16.

In the illustrated embodiment of the invention, each of devices 17 is shown to include vertical side frame members 18 held in parallel, spaced apart relation by cross members 19, 20, 21 and 22 which are welded or otherwise secured thereto, and having upper edges 23 which are inclined (FIGS. 4 and 5) to form continuations of the keg conveying rails 14. Each of devices 17 further includes a keg elevator 24 for lifting selected successive kegs from the respective conveyor section 11 or 12 onto the following conveyor section 12 or 13, respectively, and an escapement 25 for controlling the discharge of kegs from the respective conveyor section 11 or 12 onto the delivery conveyor 15 or 16, respectively.

As shown on FIGS. 3, 4 and 5, the keg elevator 24 is disposed between side frame members 18 and preferably includes a support member 26 mounted, for example, by depending guide rods 27 slidable in vertical guide tubes 28 extending from cross member 20, for vertical movement between a lowered position (FIG. 4) substantially below the top edges 23 of side frame members 18, and a raised position (FIG. 5) adjacent the relatively high end of the next conveyor section 12 or 13. Movement of support member 26 between its lowered and raised positions may be effected by a cylinder 29 mounted on cross member 20 and having a piston rod 30 extending upwardly therefrom and connected to support member 26, as at 31. Upward and downward movement of support member 26 is effected by supplying compressed air or other fluid under pressure alternatively to the lower and upper ends of cylinder 29 by way of conduits 32 and 33 extending from a supply line 34 and having solenoid controlled valves SV1 and SV2, respectively, interposed therein. Each of valves SV1 and SV2 may be of a type that vents the respective conduit 32 or 33 to atmosphere when the associated solenoid is deenergized, whereas energization of the solenoid causes compressed air to be supplied through the conduit 32 or 33 to the respective end of cylinder 29.

A cradle 35 has sides 36 with arcuate upper edges corresponding to the peripheral curvature of each keg K and a lateral web 37 connecting sides 36 at one end thereof. Support member 26 has lugs 38 projecting upwardly therefrom at its opposite sides adjacent the end of support member 26 closest to the low end of the respective conveyor section 11 or 12, and lugs 38 carry pivot pins 39 received in suitable openings located in sides 36 of cradle 35 adjacent the ends thereof remote from web 37. Thus, cradle 35 is mounted on support member 26 for vertical movement with the latter and for tilting with respect to the support member about an axis which is offset relative to the center of gravity of the cradle. The described mounting of cradle 35 permits tilting of the latter from a normal keg-retaining position (FIG. 4) where web 37 of the cradle rests against support member 26, to a keg discharging position where web 37 of the cradle is raised substantially from support member 26 (FIG. 5).

Tilting of cradle 35 from its keg-retaining position (FIG. 4) to its keg discharging position (FIG. 5) is preferably effected in response to movement of support member 26 to its raised position. In the embodiment shown, such tilting of cradle 35 is effected by an actuating rod 40 having its upper end pivotally connected, as at 41, to each of cradle sides 36 at the end of the latter remote from web 37 and extending slidably downward through a suitable opening formed in a laterally extending angle member 42 which is secured to side frame members 18. Angle member 42 forms a fixed abutment for nuts 43 adjustably disposed on a threaded lower end portion 44 of each rod 40. It will be apparent that, during upward movement of support member 26 from its lowered position (FIG. 4), cradle 35 remains in its normal keg-retaining position and rods 40 move upwardly therewith through angle member 42 until nuts 43 engage from below against the angle member as support member 26 nears its raised position. During final upward movement of support member 26 to its raised position (FIG. 5), the engagement of nuts 43 with angle member 42 prevents further upward movement of rods 40, whereby cradle 35 is rocked or tilted to its keg-discharging position.

The escapement 25 which is disposed at the downstream side of elevator 24 is shown to include a pair of crescent-shaped sides 45 (FIGS. 3, 4 and 5) held in spaced, parallel relation by connecting webs 46 and secured between side frame members 18 on a shaft 47 which is journalled in the side frame members. Crescent-shaped sides 45 are approximately symmetrical about the axis of the supporting shaft 47 and present concave upper edges 48 having opposite end portions which are alternatively projected above the inclined upper edges 23 of side frame members 18 in response to rocking of escapement 25 about the axis of shaft 47. As shown, escapement 25 is rockable about the axis of shaft 47 between a blocking position, shown in full lines on FIG. 4, where the forward end portions of concave edges 48 extend above edges 23 of side frame members 18 to arrest the movement of a keg $K_1$ at a position beyond elevator 24, and a keg delivering position, as indicated in broken lines at 25' on FIG. 4, where the rearward end portions of edges 48 project above edges 23 so that the previously arrested keg $K_1$ is free to roll beyond escapement 25 onto the adjacent delivery conveyor 15 or 16, but the keg $K_2$ next in line on the conveyor section is held against discharge by the upwardly projecting rearward portions of edges 48.

Cusp-shaped stop members 49 (FIGS. 2 and 3) may also be secured on the opposite end portions of shaft 47 at the outer sides of side frame members 18 and generally conform, in shape and angular position, to forward end portions of sides 45 of escapement 25. Thus, when escapement 25 is in its blocking position shown in full lines on FIG. 4, the forward end portions of edges 48 thereof are engageable with the mid-portion of a keg, and the stop members 49 are engageable with the opposite end portions of the keg which overhang the side frame members 18. When escapement 25 rocked to its keg delivering position shown in broken lines on FIG. 4, stop members 49 are simultaneously rocked by reason of their secure connection with shaft 47 to positions lying entirely below edges 23 of the side frame members, thereby to release the previously blocked keg for discharge from the related conveyor section.

As shown on FIGS. 4 and 5, rocking of escapement 25 and stop members 49 may be effected by a cylinder 50 which is pivotally mounted, as at 51, on cross member 19 and which has a piston rod 52 extending upwardly therefrom and pivotally connected to a rod 53 extending laterally between sides 45 of the escapement. Conduits 54 and 55 extend from a supply line 56 to the upper and lower ends of cylinder 50 and have solenoid valves SV3 and SV4 respectively interposed therein. Each of valves SV3 and SV4 may be of the type that vents the respective conduit 54 or 55 to the atmosphere when the solenoid of the valve is deenergized and that communicates the conduit 54 or 55 with the supply line 56 when the solenoid is energized, thereby to admit compressed air or other fluid under pressure to the respective end of cylinder 50. Thus, when solenoid SV3 is energized, compressed air is admitted to the upper end of cylinder 50 to retract piston rod 52 and thereby rock escapement 25 to its keg blocking position shown in full lines on FIG. 4. On the other hand, when solenoid valve SV4 is energized, compressed air is admitted to the lower end of cylinder 50 to extend piston rod 52 and thereby rock escapement 25 to its keg delivering position shown in broken lines on FIG. 4.

A control system for coordinating the operations of elevator 24 and escapement 25 at the low end of each of conveyor sections 11 and 12, may include a photocell PC1 (FIG. 2) mounted so that a light beam aimed thereat by a light source PL1 is intercepted by a keg positioned on the delivery conveyor 15 or 16 adjacent the discharge or low end of the associated conveyor section 11 or 12. As shown on FIG. 8, photocell PC1 has a normally open contact PC1$a$ interposed in the circuit for energizing the solenoid of valve SV3 from the usual electric supply lines $L_1$ and $L_2$. Contact PC1$a$ remain in its normal open position so long as photocell PC1 receives light from the source PL1, that is, so long as there is space available on the delivery conveyor 15 or 16 to receive a keg from the associated conveyor section 11 or 12. However, when a keg is present on delivery conveyor 15 or 16 adjacent the discharge end of conveyor section 11 or 12 and thereby intercepts the light beam aimed at photocell PC1, contact PC1$a$ is closed to energize solenoid valve SV3 and thereby cause movement of escapement 25 to its keg blocking position for holding a keg $K_1$ arriving at the low end of conveyor section 11 or 12.

As shown on FIG. 3, a photocell PC2 is mounted at one side of each of conveyor sections 11 and 12 so that a light beam aimed thereat by a light source PL2 disposed at the opposite side of the conveyor section is intercepted by a keg $K_1$ being held at the low end of the conveyor section by escapement 25 in its keg blocking position. Photocell PC2 has a normally open contact PC2$a$ (FIG. 8) interposed, in series with a normally closed contact PC1$b$ of photocell PC1, in the energizing circuit for the solenoid of valve SV4. Contact PC1$b$ remains in its normal closed position only so long as the light beam aimed at photocell PC1 is not intercepted by a keg on delivery conveyor 15 or 16, and normally open contact PC2$a$ is closed only when a keg $K_1$ is being held by escapement 25 in its keg blocking position. Thus, when space is avaialble on delivery conveyor 15 or 16 and a keg $K_1$ is being held by escapement 25, contacts PC1$b$ and PC2$a$ are simultaneously closed to engage the solenoid of valve SV4 and thereby cause rocking of escapement 25 to its keg delivering position so that the keg $K_1$ previously held by the escapement can then roll onto delivery conveyor 15 or 16. When the keg rolls onto delivery conveyor 15 or 16, it intercepts the light beam aimed at photocell PC1 so that contact PC1$a$ is closed and contact PC1$b$ is opened to return escapement 25 to its keg blocking position.

Figure 8:
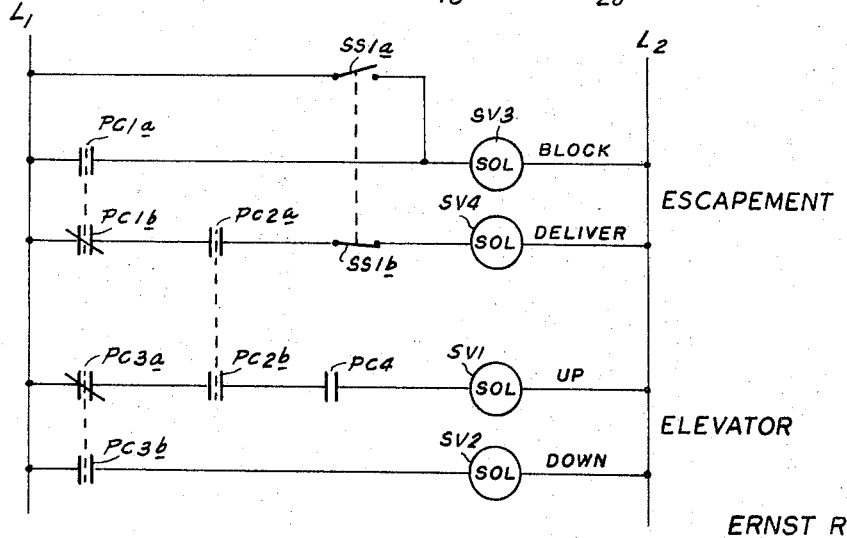
FIG. 8 is a schematic wiring diagram of controls that may be provided for the devices by which the successively conveyed kegs are selectively transferred from one conveyor section to the next or discharged from the conveyor.

If desired, as shown on FIG. 8, the control circuits for escapement 25 may further include a manually operable selector switch having contacts SS1$a$ and SS1$b$. Selector switch contact SS1$a$ is shown connected in parallel with photocell contact PC1$a$ to provide an alternate energizing circuit for solenoid valve SV3, while selector switch contact SS1$b$ is connected in series with photocell contacts PC1$b$ and PC2$a$ in the energizing circuit for solenoid valve SV4. Selector switch contacts SS1$a$ and SS1$b$ are alternately closed so that, when contact SS1$b$ in its closed position, as shown, kegs successively arriving at the low end of conveyor section 11 or 12 are discharged onto the related delivery conveyor 15 or 16 so long as space is available on the latter to receive each keg, as described above. However, when selector switch contact SS1a is closed and selector switch contact SS1b is open, the solenoid of valve SV3 is permanently energized through contact SS1a and the energizing circuit for solenoid valve SV4 is permanently intercepted at open contact SS1b to retain escapement 25 in its keg blocking position and whereby prevent discharge of kegs at the low end of the associated conveyor section 11 or 12.

In order to control the operation of elevator 24 associated with each of conveyor sections 11 and 12, there is provided a photocell PC3 disposed adjacent the relatively high or keg receiving end of the next conveyor section 12 or 13, respectively (FIGS. 2 and 5), so that a keg $K_2$ deposited on the relatively high end of conveyor section 12 or 13 will intercept a light beam aimed at photocell PC3 by a light source PL3. There is also provided a photocell PC4 disposed at one side of each of conveyor sections 11 and 12 and located so that a keg $K_2$ (FIG. 3) located on edges 23 of side frame members 18 immediately above cradle 35 will intercept a light beam aimed at photocell PC4 by a light source PL4.

As shown on FIG. 8, the energizing circuit for the solenoid of valve SV1 has connected, in series therein, a normally closed contact PC3a of photocell PC3, a normally open contact PC2b of photocell PC2 and a normally open contact of photocell PC4. The energizing circuit for the solenoid of valve SV2 is shown to have interposed therein a normally open contact PC3b of photocell PC3.

It will be apparent that solenoid valve SV1 is energized to move support member 26 and cradle 35 from the lowered position of FIG. 4 to the raised position of FIG. 5, only when space is available at the high end of the next conveyor section to receive a transferred keg so that photocell contact PC3a remains in its normal closed position, and when photocell contacts PC2b and PC4 are simultaneously closed in response to the presence of a keg $K_1$ being held against discharge by the associated escapement 25 in its keg blocking position and the presence of the next keg $K_2$ immediately above elevator 24.

As support member 26 is moved upwardly in response to the energization of solenoid valve SV1, cradle 35 lifts keg $K_2$ off edges 23 of side frame members 18 and, as support member 26 nears its raised position, cradle 35 is tilted, as previously described, to permit keg $K_2$ to roll off the cradle and onto the relatively high end of the next conveyor section 12 or 13. When the transferred keg $K_2$ rolls onto the high end of the next conveyor section 12 or 13, it intercepts the beam of light aimed at photocell PC3, to open contact PC3a and close contact PC3b, whereby solenoid valve SV1 is deenergized and solenoid valve SV2 is energized to effect downward movement or return of support member 26 to its lowered position.

Thus, so long as selector switch contacts SS1a and SS1b of the control circuits for a device 17 are in the position shown on FIG. 8, kegs arriving successively at the low end of the respective conveyor section 11 or 12 will be discharged onto the related delivery conveyor 15 or 16 provided that there is room on such delivery conveyor to receive the successive kegs. However, if no room exists on the delivery conveyor 15 or 16 to accept kegs from the related conveyor section 11 or 12, or if the positions of the selector switch contacts SS1a and SS1b are reversed from those shown on FIG. 8, then successive kegs arriving at the low end of conveyor section 11 or 12 are transferred to the next conveyor section 12 or 13 for continued movement along the conveyor. With the described arrangement, kegs can be discharged from conveyor 10 at each of delivery conveyors 15 and 16 and also at the terminal $T_2$, or all of the kegs being conveyed can be discharged only at the terminal $T_2$ or at the terminal $T_2$ and one or the other of the delivery conveyors 15 and 16.

Although the circuitry described above with reference to FIG. 8 may effect the discharge of kegs from conveyor 10 onto delivery conveyors 15 and 16 whenever there is space available thereon to receive the kegs, so that only those kegs which are in excess of the capacity of each of the delivery conveyor 15 or 16 are selected for transfer to the next conveyor section 12 or 13, modified control circuits may be easily provided for otherwise selecting those kegs to be discharged at each of the delivery conveyors 15 and 16 and those to be transferred to the next conveyor section for continued movement along conveyor 10. For example, the photocell PC4 may have its contact closed to effect upward movement of elevator 24 for transferring a keg to the next conveyor section only in response to the presence of a keg at the location of elevator 24 which has a suitably located strip or tape of reflective material secured thereon. With such an arrangement, kegs that do not have the reflective tape secured thereon will be discharged from conveyor 10 onto delivery conveyor 15 or 16, whereas kegs bearing the reflective tape will be transferred by elevator 24 to the next conveyor section for further movement along the conveyor. Thus, the conveyor 10, as described herein, may be employed for distributing kegs to several delivery conveyors so as to maintain a supply of kegs on each of the delivery conveyors, or the conveyed kegs can be sorted out among the several delivery conveyors on the basis of the contents of the kegs as indicated by the presence or absence of reflective tape on the kegs.

As previously mentioned, all of the conveyor sections 11, 12 and 13 may be constituted by rails 14 inclined from the horizontal at an optimum angle to reliably cause the rolling movement of the kegs therealong without developing excessive keg speeds. However, in some instances building or other structures in the vicinity of the conveyor may prevent the inclination of a section thereof at the optimum angle. In that case, the conveyor section which cannot be inclined at the optimum angle, for example, the section 13 on FIG. 1, may include a pair of elongated, parallel, laterally spaced conveyor screw elements 57 extending in the direction of the desired movement of the kegs along conveyor section 13 and being mounted on a frame 58 for rotation about their longitudinal axes. The kegs K successively transferred from conveyor section 12 to conveyor section 13 straddle the conveyor screw elements 57 (FIGS. 2 and 7) and thus are supported by the latter with the axes of the kegs directed transversely with respect to the axes of rotation of screw elements 57. Screw elements 57 have radially raised helical flights 59 thereon to engage the peripheral surface of each keg at locations in front and in back of the lowermost portion of the keg periphery, as indicated on FIG. 2. Thus, when screw elements 57 are simultaneously rotated, the engagement of their flights 59 with the peripheral surface of each keg causes controlled movement of the keg in the direction of the longitudinal axes of the screw elements. As shown on FIG. 6, simultaneous rotation of screw elements 57 may be effected by an electric motor 60 mounted on frame 58 and driving a sprocket 61 that engages a chain 62 running around sprockets 63 secured to screw elements 57.

It will be apparent that, if screw elements 57 are horizontal or inclined at an angle less than that necessary to effect reliable rolling movement of the kegs therealong, as shown on FIG. 1, the rotation of screw elements 57 and the engagement of their flights 59 with the peripheries of the kegs thereon will achieve the desired controlled movement of the kegs along conveyor section 13 toward terminal $T_2$. Similarly, if screw elements 57 are inclined from the horizontal by an angle that would normally result in excessive speeds of kegs rolling therealong, the engagement of the flights 59 of the rotated screw elements 57 with the peripheries of the kegs will ensure the movement of the latter at a controlled safe speed.

Although an illustrative embodiment of this invention has been described in detail herein with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. In a keg conveyor, the combination of a plurality of conveyor sections arranged end-to-end in succession and being inclined from the horizontal in the same direction so that kegs on each section are urged by gravity to move in said direction toward the relatively low end of the conveyor section, each section which is followed by another section having said low end thereof at a level substantially below the level of the relatively high end of the following conveyor section so that the difference between the elevations at the opposite termini of the conveyor, as a whole, is substantially less than the sum of the differences between the elevations at the opposite ends of said conveyor sections, and elevator means disposed adjacent said low end of each said section followed by another section and being operative to lift at least selected kegs arriving successively at said adjacent low end and to deposit each lifted keg onto said high end of the following conveyor section for continued movement therealong, said elevator means including a vertically movable support, a cradle carried by said support to move vertically with the latter from a lowered position below said adjacent low end of a conveyor section to a raised position adjacent said high end of the following conveyor section, pivot means tiltably mounting said cradle on said support for tilting relative to the latter from a normal keg retaining position to a keg discharging position, means operative to displace said cradle from said lowered position to said raised position for lifting a keg from said adjacent low end of a conveyor section, means operative when said cradle is displaced to said raised position to tilt said cradle to said keg discharging position, thereby to discharge a keg from said cradle onto said adjacent high end of the following conveyor section and means operative to return said cradle from said raised position to said lowered position after discharge of a keg from said cradle.

2. In a keg conveyor, the combination according to claim 1; wherein said pivot means is offset with respect to the center of gravity of said cradle so that the weight of the latter urges the cradle to said keg retaining position, and said means operative to discharge a keg from said cradle includes an actuating element connected to said cradle for vertical movement therewith, and an abutment member engageable by said actuating element during movement of said cradle to said raised position to arrest the vertical movement of said actuating element and thereby cause the latter to tilt said cradle to said keg discharging position.

3. In a keg conveyor, the combination of a plurality of conveyor sections arranged end-to-end in succession and being inclined from the horizontal in the same direction so that kegs on each section are urged by gravity to move in said direction toward the relatively low end of the conveyor section, each section which is followed by another section having said low end thereof at a level substantially below the level of the relatively high end of the following conveyor section so that the difference between the elevations at the opposite termini of the conveyor, as a whole, is substantially less than the sum of the differences between the elevations at the opposite ends of said conveyor sections, elevator means disposed adjacent said low end of each said section followed by another section and being operative to lift at least selected kegs arriving successively at said adjacent low end and to deposit each lifted keg onto said high end of the following conveyor section for continued movement therealong, said levels of the relatively low and high ends of successive conveyor sections being sufficiently spaced to permit the movement of kegs therebetween so that kegs can be discharged from the conveyor at said low end of each conveyor section, and means at said low end of each said conveyor section followed by another section to block the discharge of kegs at said low end of the respective section when the adjacent elevator means is operated to lift each of said selected kegs onto said following section and to permit the discharge of the other kegs arriving successively at said low end of the respective conveyor section, the last mentioned means including an escapement member mounted movably at said low end of the respective conveyor section to project into the path of kegs on said respective conveyor section alternatively in front and in back of a keg moved to said low end, thereby respectively to block further movement of the keg and to permit the discharge of the previously blocked keg while blocking the keg next in line on said respective sections.

4. In a keg conveyor, the combination according to claim 3; wherein said escapement member is disposed between said low end of the respective conveyor section and said elevator means associated with the latter; and
further comprising control means for each elevator means permitting operation of the latter to lift a keg only when said escapement member is disposed to project into said path of the kegs in front of a keg at said low end of the respective section.

5. In a keg conveyor, the combination of at least first and second conveyor sections arranged end-to-end in succession and operative to move kegs therealong, the adjacent ends of said first and second sections being at relatively low and high levels, respectively, which are sufficiently spaced to permit the discharge of kegs from said low end of the first section under said adjacent high end of the second section, and means adjacent said low end of the first section operative to lift selected kegs arriving successively at said low end and to deposit the successive lifted kegs on said high end of the second section for continued movement along the latter while the other kegs arriving successively at said low end of the first section are there discharged from the conveyor, said means including elevator means movable vertically from a lowered position below the path of travel of kegs on the low end portion of said first section to a raised position adjacent said high end of the second section, means operative to effect discharge of a keg from said elevator means onto said high end of the second section upon movement of said elevator means to said raised position, escapement means located between said elevator means and said low end of the first section and being movable to selectively block a keg at said low end and to permit the discharge of a keg from said low end and means to effect operation of said elevator means only when said escapement means is disposed to block a keg at said low end.

6. In a keg conveyor, the combination according to claim 5; wherein said elevator means includes a vertically movable support, and a cradle mounted on said support for vertical movement therewith and being tiltable for rocking movement with respect to the support between a keg retaining position and a keg discharging position; and said means operative to effect discharge of a keg from said elevator means includes an actuating element connected to said cradle for vertical movement therewith and an abutment member engageable by said actuating element during movement of said elevator means to said raised position to arrest the vertical movement of said actuating element and thereby cause the latter to tilt said cradle to said keg discharging position thereof.

7. In a keg conveyor, the combination according to claim 6; wherein the axis about which said cradle is tiltable relative to said support is offset with respect to the center of gravity of said cradle to gravitationally urge said cradle to said keg retaining position.

8. In a keg conveyor, the combination of at least first and second conveyor sections arranged end-to-end in succession and each having a length that is at least several times greater than the diameters of the kegs to be conveyed, said conveyor sections each including spaced parallel rails which, in each of said sections, are inclined from the horizontal in the direction extending from said first section toward said second section so that kegs on said rails of each section are urged by gravity to roll along the rails toward the relatively low end of the respective conveyor section, said first section having said low end thereof at a level which is sufficiently below the level of the relatively high end of said second section to permit the discharge movement of kegs off said relatively low end of the first section under said relatively high end of the second section, means extending from under said high end of the second section to receive kegs discharged from said low end of the first section and to carry away the kegs thus received, escapement means located adjacent said low end of the first section and being movable to selectively block a keg at said low end and to permit the discharge of a keg from said low end, and elevator means in advance of said escapement means adjacent said low end of the first section operable selectively to lift a keg arriving at said low end and to deposit the lifted keg on said high end of the second section for continued movement along the conveyor.

References Cited

UNITED STATES PATENTS

| | | | |
|---|---|---|---|
| 1,609,802 | 12/1926 | Ekstrom et al. | 198—24 |
| 2,037,931 | 4/1936 | Schmidt. | |
| 2,948,386 | 8/1960 | Kay et al. | 198—219 |
| 3,058,616 | 10/1962 | Loveland et al. | 198—30 X |
| 3,214,000 | 10/1965 | Bilocg | 198—33 |
| 3,270,864 | 9/1966 | Kay | 198—219 |
| 3,292,768 | 12/1966 | Matthews | 198—34 |

FOREIGN PATENTS 253,483    7/1964    Australia.

EVON C. BLUNK, *Primary Examiner.*

M. L. AJEMAN, *Assistant Examiner.*